(12) United States Patent
Nan et al.

(10) Patent No.: US 10,708,922 B2
(45) Date of Patent: Jul. 7, 2020

(54) METHOD FOR ENHANCED TRANSMISSION OF CONTROL INFORMATION, USER EQUIPMENT, BASE STATION, AND COMMUNICATIONS SYSTEM

(71) Applicant: HUAWEI TECHNOLOGIES CO., LTD., Shenzhen (CN)

(72) Inventors: Fang Nan, Beijing (CN); Zheng Yu, Beijing (CN); Xingqing Cheng, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 15/270,707

(22) Filed: Sep. 20, 2016

(65) Prior Publication Data
US 2017/0013626 A1    Jan. 12, 2017

Related U.S. Application Data

(63) Continuation of application No. PCT/CN2014/073907, filed on Mar. 21, 2014.

(51) Int. Cl.
*H04W 72/04* (2009.01)
*H04L 1/18* (2006.01)
*H04L 1/08* (2006.01)

(52) U.S. Cl.
CPC .......... *H04W 72/0486* (2013.01); *H04L 1/08* (2013.01); *H04L 1/1854* (2013.01);
(Continued)

(58) Field of Classification Search
CPC .... H04L 1/08; H04L 1/1854; H04W 72/0413; H04W 72/042; H04W 72/0446; H04W 72/0486
See application file for complete search history.

(56) References Cited

U.S. PATENT DOCUMENTS

2012/0064932 A1    3/2012    Lim et al.
2014/0078983 A1    3/2014    Park et al.
(Continued)

FOREIGN PATENT DOCUMENTS

CN    101237297         8/2008
CN    101465689 A       6/2009
(Continued)

OTHER PUBLICATIONS

International Search Report, dated Dec. 24, 2014, in International Application No. PCT/CN2014/073907 (4 pp.).
(Continued)

*Primary Examiner* — Kan Yuen
(74) *Attorney, Agent, or Firm* — Slater Matsil, LLP

(57) ABSTRACT

Embodiments of the present disclosure provide a method for enhanced transmission of control information, user equipment, a base station, and a communications system. The method includes: determining a first parameter for enhanced transmission of control information. Between a base station and UE, a $k^{th}$ subframe after a last subframe in enhanced transmission of control information may be preset as a start subframe in enhanced transmission of a PDSCH, a $j^{th}$ subframe after the last subframe in enhanced transmission of the control information may be preset as a start subframe in enhanced transmission of a PUSCH, and a start subframe in enhanced transmission of the control information is preset, where the subframes may also be radio frames. Therefore, the user equipment can accurately determine the last subframe and/or radio frame occupied by the control information, thereby ensuring performance of the PDSCH or PUSCH.

19 Claims, 1 Drawing Sheet

(52) U.S. Cl.
CPC ..... *H04W 72/042* (2013.01); *H04W 72/0413* (2013.01); *H04W 72/0446* (2013.01)

(56) References Cited

U.S. PATENT DOCUMENTS

| | | | | |
|---|---|---|---|---|
| 2014/0254519 | A1* | 9/2014 | Horiuchi | H04W 72/042 370/329 |
| 2014/0301338 | A1 | 10/2014 | Zhong et al. | |
| 2015/0063281 | A1 | 3/2015 | Xu | |
| 2015/0078224 | A1* | 3/2015 | Xiong | H04L 1/1887 370/280 |
| 2015/0131579 | A1* | 5/2015 | Li | H04L 1/08 370/329 |
| 2015/0181576 | A1* | 6/2015 | Papasakellariou | H04L 1/0072 370/329 |
| 2016/0081065 | A1 | 3/2016 | Shi et al. | |
| 2016/0183231 | A1* | 6/2016 | Shi | H04W 72/0446 370/329 |
| 2016/0249331 | A1* | 8/2016 | Park | H04L 1/1819 |

FOREIGN PATENT DOCUMENTS

| | | |
|---|---|---|
| CN | 103095395 | 5/2013 |
| CN | 103391151 | 11/2013 |
| CN | 103929266 A | 7/2014 |

OTHER PUBLICATIONS

Written Opinion of the International Searching Authority, dated Dec. 24, 2014, in International Application No. PCT/CN2014/073907 (7 pp.).
Partial Supplementary European Search Report, dated Apr. 5, 2017, in European Application No. 14886387.1 (11 pp.).
*Discussion on Repetition for Control Channel and Traffic Channel*, 3GPP TSG RAN WG1 Meeting #74 Barcelona, Spain, Aug. 19-23, 2013, R1-133062 (10 pp.).
Alcatel-Lucent: "Coverage enhancement for PDSCH," 3GPP TSG-RAN WG1 Meeting #76, Prague, Czech Republic, Feb. 10-14, 2014, R-140156.
Korean Office Action dated Oct. 18, 2017 in corresponding Korean Patent Application No. 10-2016-7028304.
International Search Report dated Dec. 24, 2014 in corresponding International Application No. PCT/Cn2014/073907.
R1-140501 Panasonic,"(E)PDCCH coverage enhancement for MTC",3GPP TSG RAN WG1 Meeting #76,Prague, Czech Republic, Feb. 10-14, 2014, total 5 pages.
Chinese Office Action dated Sep. 19, 2018 in corresponding Chinese Patent Application No. 201480000610.X (8 pages).

* cited by examiner

METHOD FOR ENHANCED TRANSMISSION OF CONTROL INFORMATION, USER EQUIPMENT, BASE STATION, AND COMMUNICATIONS SYSTEM

CROSS-REFERENCE TO RELATED APPLICATIONS

This application is a continuation of International Application No. PCT/CN2014/073907, filed on Mar. 21, 2014, which is hereby incorporated by reference in its entirety.

TECHNICAL FIELD

The present disclosure relates to the field of communications technologies, and in particular, to a method for enhanced transmission of control information, user equipment, a base station, and a communications system.

BACKGROUND

In modern communication, enhanced transmission is used to implement enhanced communication within a certain coverage area. For example, enhanced transmission is performed by using repeated transmission, spreading transmission, transmission time interval bundling transmission, or power boosting transmission, so that communication is implemented between a base station and a terminal at an edge of the coverage area.

In the prior art, to implement enhanced transmission, a base station may repeatedly transmit control information to user equipment (UE), and the UE attempts to use different quantities of repetitions to perform detection on the control information. Specifically, the UE first determines that a quantity of repetitions of the control information is 1, that is, the UE receives the control information in one subframe, and performs detection on the received control information. If the control information fails to be detected, the UE determines that the quantity of repetitions of the control information is 2, receives the repeated control information in two subframes, and performs detection on the control information again. If the control information still fails to be detected, the UE adds 1 to the determined quantity of repetitions of the control information, receives the repeated control information in multiple subframes corresponding to the determined quantity of repetitions, and performs detection on the control information again. This process continues until the control information is detected successfully.

However, when successfully detecting the control information, the UE cannot determine a quantity of repetitions of transmitting the control information by the base station.

SUMMARY

The present disclosure provides a method for enhanced transmission of control information, user equipment, a base station, and a communications system, so as to solve a problem that UE cannot determine a quantity of repetitions of transmitting control information by a base station.

According to a first aspect, an embodiment of the present disclosure provides a method for enhanced transmission of control information, where the method includes:

determining a first parameter, where the first parameter includes at least one of a quantity of repetitions of enhanced transmission of control information, a repetition level of enhanced transmission of control information, a quantity of subframes occupied in enhanced transmission of control information, an index of a last subframe in enhanced transmission of control information, an index of a radio frame in which a last subframe in enhanced transmission of control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of control information and a start subframe in enhanced transmission of a PDSCH, a subframe offset between a start subframe in enhanced transmission of control information and a start subframe in enhanced transmission of a PUSCH, a radio frame offset between a start radio frame in enhanced transmission of control information and a start radio frame in enhanced transmission of a PDSCH, or a radio frame offset between a start radio frame in enhanced transmission of control information and a start radio frame in enhanced transmission of a PUSCH; and performing enhanced transmission of the control information according to the first parameter.

In a first possible implementation manner, the control information includes information indicating the first parameter.

With reference to the first possible implementation manner of the first aspect, in a second possible implementation manner, a bit or field that is in the control information and indicates first information indicates the first parameter, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the control information includes a bit or field indicating the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

With reference to the implementation manner of the first aspect, in a third possible implementation manner, the performing enhanced transmission of the control information according to the first parameter includes:

determining, according to the first parameter, a second parameter to which the first parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information; and performing enhanced transmission of the control information according to the first parameter and/or the second parameter.

With reference to the third possible implementation manner of the first aspect, in a fourth possible implementation manner, the determining, according to the first parameter, a second parameter to which the first parameter is mapped includes:

determining, according to the first parameter and a one-to-one mapping relationship between the first parameter and the second parameter, the second parameter to which the first parameter is mapped.

With reference to the third possible implementation manner of the first aspect or the fourth possible implementation manner of the first aspect, in a fifth possible implementation manner, the performing enhanced transmission of the control information according to the second parameter includes:

when the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information, performing enhanced transmission of the control information by using the second parameter in at least one subframe in multiple subframes in enhanced transmission of the control information.

With reference to the fifth possible implementation manner of the first aspect, in a sixth possible implementation manner, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

With reference to any implementation manner of the first aspect to the sixth possible implementation manner of the first aspect, in a seventh possible implementation manner, the method further includes:

determining, according to the first parameter, an index of a start subframe of information carried in a physical shared channel in enhanced transmission, and starting from the subframe indicated by the index of the start subframe, performing enhanced transmission of the information carried in the physical shared channel, where the physical shared channel includes the physical downlink shared channel (PDSCH) or the physical uplink shared channel (PUSCH); or determining, according to the first parameter, an index of a radio frame in which a start subframe of information carried in a physical shared channel in enhanced transmission is located, and starting from the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH); or determining, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH).

According to a second aspect, an embodiment of the present disclosure provides a method for enhanced transmission of control information, where the method includes:

receiving control information in enhanced transmission; and determining a first parameter according to the control information, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH is located, an index of a radio frame in which a start subframe in enhanced transmission of a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH.

In a first possible implementation manner, the determining a first parameter according to the control information includes:

determining the first parameter according to information that is included in the control information and indicates the first parameter.

With reference to the first possible implementation manner of the second aspect, in a second possible implementation manner, the determining the first parameter according to information that is included in the control information and indicates the first parameter includes:

determining the first parameter according to a bit or field that is in the control information and indicates first information, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or determining the first parameter according to a bit or field that is in the control information and indicates the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

With reference to the implementation manner of the second aspect, in a third possible implementation manner, the determining a first parameter according to the control information includes:

determining, according to the control information, a second parameter for enhanced transmission of the control information, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information; and determining, according to the second parameter for enhanced transmission of the control information, the first parameter to which the second parameter is mapped.

With reference to the third possible implementation manner of the second aspect, in a fourth possible implementation manner, the determining, according to the second parameter for enhanced transmission of the control information, the first parameter to which the second parameter is mapped includes:

determining, according to the second parameter for enhanced transmission of the control information and a one-to-one mapping relationship between the first parameter and the second parameter, the first parameter to which the second parameter is mapped.

With reference to the third possible implementation manner of the second aspect or the fourth possible implementation manner of the second aspect, in a fifth possible implementation manner, the determining, according to the second parameter for enhanced transmission of the control information, the first parameter to which the second parameter is mapped includes:

when the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information, determining, according to the second parameter used in at least one subframe in multiple subframes in enhanced transmission of the control information, the first parameter to which the second parameter is mapped.

With reference to the fifth possible implementation manner of the second aspect, in a sixth possible implementation manner, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

With reference to any implementation manner of the second aspect to the sixth possible implementation manner of the second aspect, in a seventh possible implementation manner, the method further includes:

determining, according to the first parameter, an index of a start subframe of information carried in a physical shared channel in enhanced transmission, and starting from the subframe indicated by the index of the start subframe, performing enhanced transmission of the information carried in the physical shared channel, where the physical shared channel includes the physical downlink shared channel (PDSCH) or the physical uplink shared channel (PUSCH); or determining, according to the first parameter, an index of a radio frame in which a start subframe of information carried in a physical shared channel in enhanced transmission is located, and starting from the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH); or determining, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH).

According to a third aspect, an embodiment of the present disclosure provides a base station, including:

a processor, configured to determine a first parameter, where the first parameter includes at least one of a quantity of repetitions of enhanced transmission of control information, a repetition level of enhanced transmission of control information, a quantity of subframes occupied in enhanced transmission of control information, an index of a last subframe in enhanced transmission of control information, an index of a radio frame in which a last subframe in enhanced transmission of control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of control information and a start subframe in enhanced transmission of a PDSCH, a subframe offset between a start subframe in enhanced transmission of control information and a start subframe in enhanced transmission of a PUSCH, a radio frame offset between a start radio frame in enhanced transmission of control information and a start radio frame in enhanced transmission of a PDSCH, or a radio frame offset between a start radio frame in enhanced transmission of control information and a start radio frame in enhanced transmission of a PUSCH; and a transceiver, configured to perform enhanced transmission of the control information according to the first parameter.

In a first possible implementation manner, the control information includes information indicating the first parameter.

With reference to the first possible implementation manner of the third aspect, in a second possible implementation manner, a bit or field that is in the control information and indicates first information indicates the first parameter, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the control information includes a bit or field indicating the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

With reference to the implementation manner of the third aspect, in a third possible implementation manner, the processor is specifically configured to determine, according to the first parameter, a second parameter to which the first parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information; and the transceiver is specifically configured to perform enhanced transmission of the control information according to the first parameter and/or the second parameter.

With reference to the third possible implementation manner of the third aspect, in a fourth possible implementation manner, the processor is specifically configured to determine, according to the first parameter and a one-to-one mapping relationship between the first parameter and the second parameter, the second parameter to which the first parameter is mapped.

With reference to the third possible implementation manner of the third aspect or the fourth possible implementation manner of the third aspect, in a fifth possible implementation manner, the transceiver is specifically configured to perform enhanced transmission of the control information by using the second parameter in at least one subframe in multiple subframes in enhanced transmission of the control information, where the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information.

With reference to the fifth possible implementation manner of the third aspect, in a sixth possible implementation manner, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

With reference to any implementation manner of the third aspect to the sixth possible implementation manner of the third aspect, in a seventh possible implementation manner, the base station further includes:

the processor is further configured to determine, according to the first parameter, an index of a start subframe of information carried in a physical shared channel in enhanced transmission, and starting from the subframe indicated by the index of the start subframe, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a radio frame in which a start subframe of information carried in a physical shared channel in enhanced transmission is located, and starting from the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH).

According to a fourth aspect, an embodiment of the present disclosure provides user equipment, including:

a receiver, configured to receive control information in enhanced transmission; and a processor, configured to determine a first parameter according to the control information, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH is located, an index of a radio frame in which a start subframe in enhanced transmission of a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH.

In a first possible implementation manner, the processor is specifically configured to determine the first parameter according to information that is included in the control information and indicates the first parameter.

With reference to the first possible implementation manner of the fourth aspect, in a second possible implementation manner, the processor is specifically configured to determine the first parameter according to a bit or field that is in the control information and indicates first information, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the processor is specifically configured to determine the first parameter according to a bit or field that is in the control information and indicates the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

With reference to the implementation manner of the fourth aspect, in a third possible implementation manner, the processor is specifically configured to determine, according to the control information, a second parameter for enhanced transmission of the control information, and determine, according to the second parameter for enhanced transmission of the control information, the first parameter to which the second parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information.

With reference to the third possible implementation manner of the fourth aspect, in a fourth possible implementation manner, the processor is specifically configured to determine, according to the second parameter for enhanced transmission of the control information and a one-to-one mapping relationship between the first parameter and the second parameter, the first parameter to which the second parameter is mapped.

With reference to the third possible implementation manner of the fourth aspect or the fourth possible implementation manner of the fourth aspect, in a fifth possible implementation manner, the processor is specifically configured to determine, according to the second parameter used in at least one subframe in multiple subframes in enhanced transmission of the control information, the first parameter to which the second parameter is mapped, where the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information.

With reference to the fifth possible implementation manner of the fourth aspect, in a sixth possible implementation manner, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

With reference to any implementation manner of the fourth aspect to the sixth possible implementation manner of the fourth aspect, in a seventh possible implementation manner, the processor is further configured to determine, according to the first parameter, an index of a start subframe of information carried in a physical shared channel in enhanced transmission, and starting from the subframe indicated by the index of the start subframe, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a radio frame in which a start subframe of information carried in a physical shared channel in enhanced transmission is located, and starting from the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH).

According to a fifth aspect, an embodiment of the present disclosure provides a communications system, including the base station according to the third aspect to the seventh possible implementation manner of the third aspect and the user equipment according to the fourth aspect to the seventh possible implementation manner of the fourth aspect.

According to the method for enhanced transmission of control information, the user equipment, the base station, and the communications system provided by the embodiments of the present disclosure, a first parameter for enhanced transmission of control information is determined, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH; and enhanced transmission of the control information is performed according to the first parameter. It should be noted that, between a base station and UE, a kth subframe after a last subframe in enhanced transmission of control information may be preset as a start subframe in enhanced transmission of a PDSCH, a jth subframe after the last subframe in enhanced transmission of the control information may be preset as a start subframe in enhanced transmission of a PUSCH, and a start subframe in enhanced transmission of the control information is preset, where the subframes may also be radio frames. The UE can determine a quantity of repetitions of enhanced transmission of the control information according to one or more of the preset start subframe, the preset radio frame, and the first parameter. Therefore, the user equipment can accurately determine the last subframe and/or radio frame occupied by the control information, and further, can accurately determine a start time for receiving the repeatedly transmitted PDSCH or a start time for repeatedly transmitting the PUSCH, thereby ensuring performance of the PDSCH or PUSCH, where the start time includes the start subframe and/or the start radio frame.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
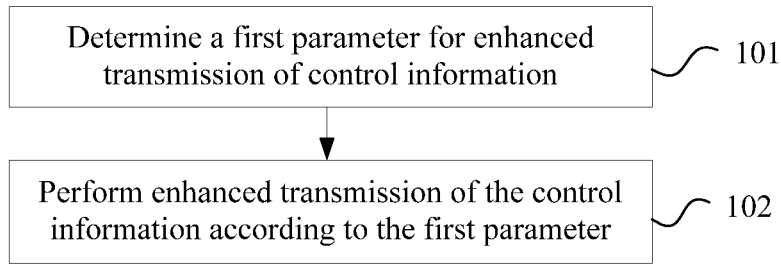
FIG. 1 is a schematic flowchart of a method for enhanced transmission of control information according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

A method for enhanced transmission of control information according to an embodiment of the present disclosure may be specifically applied in a communications system when enhanced transmission of control information is performed between a base station and user equipment. The communications system may be a Long Term Evolution (Long Term Evolution, LTE for short) system, a Code Division Multiple Access (Code Division Multiple Access, CDMA for short) 2000 system, a Universal Mobile Telecommunications System (Universal Mobile Telecommunications System, UMTS for short) system, a Global System for Mobile communication (Global System for Mobile communication, GSM for short) system, or the like. The method for enhanced transmission of control information according to the embodiment may be specifically performed by the base station or the user equipment. The method for enhanced transmission of control information may be integrated in the base station or the user equipment, and the method for enhanced transmission of control information may be implemented by using software and/or hardware. An example in which a communications system is an LTE system is hereinafter used to describe in detail a method and a base station or user equipment provided by embodiments.

In the embodiments of the present disclosure, control information may be downlink control information. The control information may be carried in a control channel, where the control channel may be a physical downlink control channel (PDCCH) or an enhanced physical downlink control channel (ePDCCH). The control information may be used for scheduling a common information, uplink dedicated data, or downlink dedicated data, and/or indicating a used modulation and coding scheme or the like. In addition, the control information may be further used for indicating a random access resource for non-contention based random access, or used for triggering whether to enable UE to detect the common information or downlink dedicated data or UE to transmit uplink dedicated data, or indicating a specific function, or the like, which is not limited herein. In the embodiments of the present disclosure, a control channel element (CCE) may also be an enhanced control channel element (eCCE).

In the present disclosure, enhanced transmission of control information may be specifically one or a combination of repeated transmission, spreading transmission, transmission time interval bundling transmission, and power-boosting transmission of control information. Enhanced transmission of control information refers to enhanced transmission of control information in multiple subframes. The common information or downlink dedicated data is carried in a physical downlink shared channel (PDSCH), and uplink dedicated data is carried in a physical uplink shared channel (PUSCH). The method for enhanced transmission of control information may also be applied to enhanced transmission of information carried in a PDSCH and/or a PUSCH. The enhanced transmission of control information may also be referred to as enhanced transmission of a control channel. The enhanced transmission of information carried in a PDSCH may also be referred to as enhanced transmission of a PDSCH. The enhanced transmission of information carried in a PUSCH may also be referred to as enhanced transmission of a PUSCH. The transmission may be transmitting and/or receiving.

When the UE attempts to use different quantities of repetitions to perform detection on control information, the UE may further determine a quantity of repetitions from a control information repetition quantity set specified or configured in advance, receive repeated control information in multiple subframes corresponding to the determined quantity of repetitions, and perform detection on the received control information. If the detection fails, the UE determines a quantity of repetitions again from the control information repetition quantity set specified or configured in advance, and performs detection on the control information again until the detection succeeds. The foregoing detection method for the UE is also applicable to the embodiments of the present disclosure, and is not limited herein.

It should be noted that, a quantity X of repetitions of transmitting the control information includes initial transmission of the control information. That is, the quantity X of repetitions of transmitting the control information includes initial transmission of the control information and additional X−1 repetitions of transmitting the control information. When the quantity of repetitions of transmitting the control information or a quantity of subframes occupied in repeated transmission of the control information is 1, repeated transmission of the control information is transmission of the control information. Similarly, the definition of the quantity of repetitions of transmitting the control information may be applied to the quantity of repetitions of transmitting another channel (such as a PDSCH or a PUSCH).

FIG. 1 is a schematic flowchart of a method for enhanced transmission of control information according to an embodiment of the present disclosure. As shown in FIG. 1, this embodiment may be performed by a base station. The method for enhanced transmission of control information according to this embodiment specifically includes the following steps:

Step 101: Determine a first parameter for enhanced transmission of control information.

The first parameter in this embodiment includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a physical downlink shared channel (PDSCH) or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH. The enhanced transmission of the PDSCH may also be transmission of the PDSCH, and the enhanced transmission of the PUSCH may also be transmission of the PUSCH. In this embodiment, the enhanced transmission of the PDSCH and the enhanced transmission of the PUSCH are used as examples for description.

It should be noted that, repetition levels of enhanced transmission of the control information may be multiple repetition levels defined by a communications system, a communications network, or a base station according to a quantity of repetitions of transmitting the control information. That is, each repetition level corresponds to a quantity of repetitions of transmitting the control information or a quantity of subframes occupied in repeated transmission of the control information.

Step 102: Perform enhanced transmission of the control information according to the first parameter.

The performing enhanced transmission of the control information according to the first parameter includes at least the following two implementation manners:

In a first implementation manner, the base station performs enhanced transmission of the control information, where the control information includes information indicating the first parameter.

It should be noted that, that the control information includes information indicating the first parameter may be specifically: a bit or field that is in the control information and indicates first information indicates the first parameter; or the control information includes a bit or field indicating the first parameter, where the control information does not include a bit or field indicating first information, and the first information includes at least one of hybrid automatic repeat request (Hybrid Automatic Repeat Request) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

For example, that a bit or field that is in the control information and indicates first information indicates the first parameter, may be that some bits or all bits that are in the control information and indicate the first information indicate the first parameter. For example, when the first information is the HARQ process number information, a bit that is in the existing control information and indicates the HARQ process number information is redefined to indicate the first parameter. For a frame structure type 1, three bits in the control information are used to indicate a downlink HARQ process number, and for a frame structure type 2, four bits are used to indicate a downlink HARQ process number. For the frame structure type 1, one or more bits in the three bits indicating the HARQ process number may be defined to indicate the first parameter. For the frame structure type 2, one or more bits in the four bits indicating the HARQ process number may be defined to indicate the first parameter. For example, when the first parameter is the quantity of repetitions of enhanced transmission of the control information, if the quantity of repetitions has four values, it indicates that the first parameter requires two bits. For example, two bits in bits indicating the HARQ process number are defined to indicate the first parameter.

For example, the control information includes a bit or field indicating the first parameter, where the control information does not include a bit or field indicating the first information, for example, the first information is the HARQ process number information. A format k of the existing control information includes a field indicating the HARQ process number information. Therefore, a format k of repeatedly transmitted control information does not include a bit or field indicating the HARQ process number information, and the format k of the repeatedly transmitted control information includes a bit or field indicating the first parameter.

In a second implementation manner, a second parameter to which the first parameter is mapped is determined according to the first parameter, and then enhanced transmission of the control information is performed according to the first parameter and/or the second parameter. The second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information.

Further, that a second parameter to which the first parameter is mapped is determined according to the first parameter, may include:

the base station determines, according to the first parameter and a one-to-one mapping relationship between the first parameter and the second parameter, the second parameter to which the first parameter is mapped.

It should be noted that, when the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information, the performing enhanced transmission of the control information according to the second parameter includes: performing enhanced transmission of the control information by using the second parameter in at least one subframe in multiple subframes in enhanced transmission of the control information.

For example, the at least one subframe in the multiple subframes in enhanced transmission of the control information may include the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

The one-to-one mapping relationship between the first parameter and the second parameter may include the following several mapping relationships, and specifically include:

In a first mapping relationship, the first parameter is a quantity of repetitions of transmitting the control information, and the second parameter is a time resource used in repeated transmission of the control information. For example, if the base station specifies three first parameters, namely, three quantities of repetitions of repeatedly transmitting the control information, the three quantities of repetitions are marked as a quantity a of repetitions, a quantity b of repetitions, and a quantity c of repetitions respectively. In addition, the base station specifies three time resources used in repeated transmission of the control information, which are marked as a time resource 1, a time resource 2, and a time resource 3 respectively. Each quantity of repetitions of transmitting the control information corresponds to a time resource used in repeated transmission of the control information. That is, the time resource 1 corresponds to the quantity a of repetitions; the time resource 2 corresponds to the quantity b of repetitions; the time resource 3 corresponds to the quantity c of repetitions. If the UE detects the control information according to the time resource 2, it is determined, according to the one-to-one mapping relationship between the time source 2 and the quantity b of repetitions, that the quantity of repetitions of the control information is the quantity b of repetitions. Further, the UE determines, according to the quantity b of repetitions, a start subframe for receiving a repeatedly transmitted PDSCH or a start subframe for repeatedly transmitting a PUSCH, so as to receive the repeatedly transmitted PDSCH or repeatedly transmit the PUSCH.

In a second mapping relationship, the first parameter is a quantity of repetitions of transmitting the control information, and the second parameter is an aggregation level of a PDCCH used in repeated transmission of the control information. If the base station specifies three aggregation levels of the PDCCH used in repeated transmission of the control information, the three aggregation levels are marked as aggregation levels A, B, and C respectively. Each quantity of repetitions of transmitting the control information corresponds to an aggregation level of the PDCCH used in repeated transmission of the control information. That is, if there are three quantities a, b, and c of repetitions of repeatedly transmitting the control information, a quantity a of repetitions corresponds to the aggregation level A; a quantity b of repetitions corresponds to the aggregation level B; and a quantity c of repetitions corresponds to the aggregation level C. The aggregation level of the PDCCH used in repeated transmission of the control information refers to an aggregation level of the PDCCH used in at least one subframe in multiple subframes in which repeated transmission of the control information is performed. Optionally, when the control information is repeatedly transmitted in multiple subframes, an aggregation level corresponding to a quantity of repetitions is used in each subframe. If the UE uses the aggregation level B in at least one subframe in the multiple subframes in which repeated transmission of the control information is performed and detects the repeatedly transmitted control information, the UE determines, according to the one-to-one mapping relationship between the aggregation level B and the quantity b of repetitions, that the quantity of repetitions of the control information is the quantity b of repetitions. Further, the UE determines, according to the quantity b of repetitions, a start subframe for receiving a repeatedly transmitted PDSCH or a start subframe for repeatedly transmitting a PUSCH, so as to receive the repeatedly transmitted PDSCH or repeatedly transmit the PUSCH. When the quantities of repetitions of repeatedly transmitting the control information are different, corresponding aggregation levels of the PDCCH used in repeated transmission of the control information are also different.

In a third mapping relationship, the first parameter is a quantity of repetitions of transmitting the control information, and the second parameter is a pattern used in repeated transmission of the control information. When the quantities of repetitions of repeatedly transmitting the control information are different, corresponding patterns used in repeated transmission of the control information are also different.

Optionally, a pattern used in repeated transmission of the control information includes one or more aggregation levels. When the control information is repeatedly transmitted in multiple subframes, an aggregation level used in each subframe is selected in sequence according to an aggregation level included in the pattern used in repeated transmission of the control information and corresponding to a quantity of repetitions of transmitting the control information. For example, when a pattern used in repeated transmission of the control information and corresponding to a quantity of repetitions of transmitting the control information is 4 and 8, an aggregation level used in each subframe in the multiple subframes in which repeated transmission of the control information is performed is 4, 8, 4, 8, . . . in sequence. For example, if there are three quantities a, b, and c of repetitions of repeatedly transmitting the control information, patterns used in repeated transmission of the control information and corresponding to the quantities a, b, and c of repetitions of repeatedly transmitting the control information are 2 and 8, 4 and 8, and 8 and 8 respectively.

Optionally, a pattern used in repeated transmission of the control information includes one or more PDCCH candidate indexes. The PDCCH candidate index is used to indicate a same PDCCH candidate. When the control information is repeatedly transmitted in multiple subframes, a PDCCH candidate used in each subframe is selected in sequence according to a PDCCH candidate indicated by a PDCCH candidate index included in a pattern used in repeated transmission of the control information and corresponding to a quantity of repetitions of transmitting the control information. For example, when a pattern used in repeated transmission of the control information and corresponding to a quantity of repetitions of transmitting the control information is 1 and 2, PDCCH candidates used in the multiple subframes in which repeated transmission of the control information is performed are candidates indicated by PDCCH candidate indexes 1, 2, 1, 2, . . . in sequence. For example, if there are three quantities a, b, and c of repetitions of repeatedly transmitting the control information, patterns used in repeated transmission of the control information and corresponding to the quantities a, b, and c of repetitions of repeatedly transmitting the control information are 1 and 2, 1 and 3, and 1 and 4 respectively.

In a fourth mapping relationship, the first parameter is a quantity of repetitions of transmitting the control information, and the second parameter is a frequency resource used in repeated transmission of the control information. The frequency resource used in repeated transmission of the control information refers to a frequency resource used in at least one subframe in multiple subframes in which repeated transmission of the control information is performed. Optionally, when the control information is repeatedly transmitted in multiple subframes, the frequency resource corresponding to the quantity of repetitions of transmitting the control information is used in each subframe. Frequency resources corresponding to different first parameters may be orthogonal, that is, frequency resources corresponding to different first parameters do not overlap. Frequency resources corresponding to different first parameters may also overlap.

In a fifth mapping relationship, the first parameter is a quantity of repetitions of transmitting the control information, and the second parameter is a resource element RE used in repeated transmission of the control information. The resource element RE used in repeated transmission of the control information refers to a resource element RE used in at least one subframe in multiple subframes in which repeated transmission of the control information is performed. Optionally, when the control information is repeatedly transmitted in multiple subframes, the RE corresponding to the quantity of repetitions of transmitting the control information is used in each subframe. REs corresponding to different first parameters may include same REs or may include different REs.

In a sixth mapping relationship, the first parameter is a quantity of repetitions of transmitting the control information, and the second parameter is a search space corresponding to an aggregation level of a PDCCH used in repeated transmission of the control information. The search space corresponding to the aggregation level of the PDCCH used in repeated transmission of the control information refers to a search space corresponding to an aggregation level of a PDCCH used in at least one subframe in multiple subframes in which repeated transmission of the control information is performed. When the quantities of repetitions of repeatedly transmitting the control information are different, corresponding search spaces do not overlap. That the search spaces do not overlap means that search spaces corresponding to different quantities of repetitions of repeatedly transmitting the control information do not include a same PDCCH candidate. Optionally, the search spaces corresponding to the aggregation level of the PDCCH used in the at least one subframe and corresponding to different quantities of repetitions of repeatedly transmitting the control information have different start points. For example, a start point of a search space corresponding to a quantity a of repetitions of repeatedly transmitting the control information is Ym, and a start point of a search space corresponding to a quantity b of repetitions of repeatedly transmitting the control information is Yn, where Yn=Ym+X, X is greater than or equal to a quantity of control channel elements CCEs included in the search space corresponding to the quantity a of repetitions of repeatedly transmitting the control information, and a and b are adjacent quantities of repetitions that may be used in repeated transmission of the control information. Optionally, when the control information is repeatedly transmitted in multiple subframes, the search space and/or the start point of the search space corresponding to the quantity of repetitions of transmitting the control information are/is used in each subframe.

In a seventh mapping relationship, the first parameter is a quantity of repetitions of transmitting the control information, and the second parameter is an index of a PDCCH candidate used in repeated transmission of the control information. The index of the PDCCH candidate used in repeated transmission of the control information refers to an index of a PDCCH candidate used in at least one subframe in multiple subframes in which repeated transmission of the control information is performed. When the quantities of repetitions of repeatedly transmitting the control information are different, corresponding PDCCH candidate indexes are different. A PDCCH candidate indicated by a PDCCH candidate index may be a PDCCH candidate in a same PDCCH search space or may be a PDCCH candidate in different PDCCH search spaces. Optionally, when the control information is repeatedly transmitted in multiple subframes, the index of the PDCCH candidate corresponding to the quantity of repetitions of transmitting the control information is used in each subframe.

In an eighth mapping relationship, the first parameter is a quantity of repetitions of transmitting the control information, and the second parameter is a first CCE index used in repeated transmission of the control information. The first CCE index used in repeated transmission of the control information refers to a first CCE index used in at least one subframe in multiple subframes in which repeated transmission of the control information is performed. When the quantities of repetitions of repeatedly transmitting the control information are different, corresponding first CCE indexes are different. Optionally, when the control information is repeatedly transmitted in multiple subframes, the first CCE index corresponding to the quantity of repetitions of transmitting the control information is used in each subframe.

In a ninth mapping relationship, the first parameter is a quantity of repetitions of transmitting the control information, and the second parameter is a CCE set used in repeated transmission of the control information. The CCE set used in repeated transmission of the control information refers to a CCE set used in at least one subframe in multiple subframes in which repeated transmission of the control information is performed. When the quantities of repetitions of repeatedly transmitting the control information are different, corresponding CCE sets are different. The CCE set includes L CCEs or CCE indexes, where L is an aggregation level used in a subframe using the CCE set. That the CCE sets are different means that at least one of CCEs or CCE indexes included in the CCE sets corresponding to different quantities of repetitions of repeatedly transmitting the control information is different. Optionally, when the control information is repeatedly transmitted in multiple subframes, the CCE set corresponding to the quantity of repetitions of transmitting the control information is used in each subframe.

In a tenth mapping relationship, the first parameter is a quantity of repetitions of transmitting the control information, and the second parameter is a format used in repeated transmission of the control information. When the quantities of repetitions of repeatedly transmitting the control information are different, corresponding formats used in repeated transmission of the control information are different. For example, if there are three quantities a, b, and c of repetitions of repeatedly transmitting the control information, it may be specified that control information formats corresponding to the quantities a, b, and c of repetitions of repeatedly transmitting the control information are a format 1C, a format 1A, and a format 1 respectively.

In an eleventh mapping relationship, the first parameter is a quantity of repetitions of transmitting the control information, and the second parameter is a load size used in repeated transmission of the control information. When the quantities of repetitions of repeatedly transmitting the control information are different, corresponding load sizes are different. For example, if there are three quantities a, b, and c of repetitions of repeatedly transmitting the control information, it may be specified that the load sizes corresponding to the quantities a, b, and c of repetitions of repeatedly transmitting the control information increase in sequence by one bit.

In a twelfth mapping relationship, the first parameter is a quantity of repetitions of transmitting the control information, and the second parameter is a scrambling sequence used in repeated transmission of the control information. When the quantities of repetitions of repeatedly transmitting the control information are different, corresponding scrambling sequences are different. The scrambling sequence may be used to scramble a cyclic redundancy check (CRC) of the control information, and may also be used to scramble bits after the control information is coded and before the control information is modulated.

In a thirteenth mapping relationship, the first parameter is a quantity of repetitions of transmitting the control information, and the second parameter is a radio network temporary identifier used in repeated transmission of the control information. When the quantities of repetitions of repeatedly transmitting the control information are different, corresponding radio network temporary identifiers are different. The radio network temporary identifier may be used to scramble a cyclic redundancy check (CRC) of the control information; or a scrambling sequence used in repeated transmission of the control information is generated according to the radio network temporary identifier. The radio network temporary identifier may be in multiple forms, for example, a system information radio network temporary identifier (SI-RNTI), a paging radio network temporary identifier (P-RNTI), a cell radio network temporary identifier (C-RNTI), a semi-persistent scheduling cell radio network temporary identifier (SPS C-RNTI), a transmit power control physical uplink control channel radio network temporary identifier (TPC-PUCCH-RNTI), a transmit power control physical uplink shared channel radio network temporary identifier (TPC-PUSCH-RNTI), a random access radio network temporary identifier (RA-RNTI), a temporary cell radio network temporary identifier Temporary (C-RNTI), and an enhanced radio network temporary identifier (e-RNTI), which are not limited in the embodiment of the present disclosure.

In the embodiment of the present disclosure, a first parameter for enhanced transmission of control information is determined, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH; and enhanced transmission of the control information is performed according to the first parameter. It should be noted that, between a base station and UE, a $k^{th}$ subframe after a last subframe in enhanced transmission of control information may be preset as a start subframe in enhanced transmission of a PDSCH, a $j^{th}$ subframe after the last subframe in enhanced transmission of the control information may be preset as a start subframe in enhanced transmission of a PUSCH, and a start subframe in enhanced transmission of the control information is preset, where the subframes may also be radio frames. The UE can determine a quantity of repetitions of enhanced transmission of the control information according to one or more of the preset start subframe, the preset radio frame, and the first parameter. Therefore, the user equipment can accurately determine the last subframe and/or radio frame occupied by the control information, and further, can accurately determine a start time for receiving the repeatedly transmitted PDSCH or a start time for repeatedly transmitting the PUSCH, thereby ensuring performance of the PDSCH or PUSCH, where the start time includes the start subframe and/or the start radio frame.

In the embodiment of the present disclosure, the receiving the repeatedly transmitted PDSCH may also be receiving the PDSCH, namely, receiving the PDSCH transmitted in one subframe. The repeatedly transmitting the PUSCH may also be transmitting the PUSCH.

On a basis of the foregoing embodiment, the method may further include:

determining, according to the first parameter, an index of a start subframe of information carried in a physical shared channel in enhanced transmission, and starting from the subframe indicated by the index of the start subframe, performing enhanced transmission of the information carried in the physical shared channel, where the physical shared channel includes the physical downlink shared channel (PDSCH) or the physical uplink shared channel (PUSCH); or determining, according to the first parameter, an index of a radio frame in which a start subframe of information carried in a physical shared channel in enhanced transmission is located, and starting from the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH); or determining, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, performing enhanced transmission of the information carried in the physical shared channel, where the physical shared channel includes the physical downlink shared channel (PDSCH) or the physical uplink shared channel (PUSCH).

The performing enhanced transmission of the information carried in the physical shared channel may be receiving the repeatedly transmitted PDSCH, or receiving the information carried in the repeatedly transmitted PDSCH, or repeatedly transmitting the PUSCH, or repeatedly transmitting the information carried in the PUSCH.

In this embodiment, the start time for receiving the repeatedly transmitted PDSCH or the start time for repeatedly transmitting the PUSCH may be accurately determined, so that the repeatedly transmitted PDSCH can be received accurately or that the PUSCH can be repeatedly transmitted accurately. Therefore, transmission performance of the PDSCH or the PUSCH is improved, and utilization of system resources is also improved.

Figure 2:
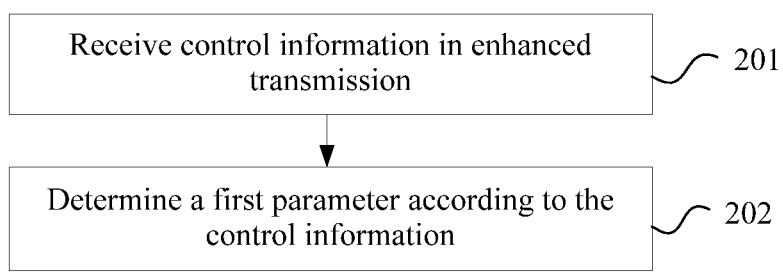
FIG. 2 is a schematic flowchart of a method for enhanced transmission of control information according to another embodiment of the present disclosure.

FIG. 2 is a schematic flowchart of a method for enhanced transmission of control information according to another embodiment of the present disclosure. As shown in FIG. 2, this embodiment may be performed by user equipment UE.

The method for enhanced transmission of control information according to this embodiment specifically includes the following steps:

Step 201: Receive control information in enhanced transmission.

Specifically, UE receives control information in enhanced transmission from a base station.

Step 202: Determine a first parameter according to the control information.

In this embodiment, the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH is located, an index of a radio frame in which a start subframe in enhanced transmission of a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH.

The determining a first parameter according to the control information includes at least the following two application scenarios, specifically including:

In a first application scenario, the UE determines the first parameter according to information that is included in the control information and indicates the first parameter.

That the UE determines the first parameter according to information that is included in the control information and indicates the first parameter includes at least two implementation manners, specifically including:

a first implementation manner: determining the first parameter according to a bit or field that is in the control information and indicates first information, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or a second implementation manner: determining the first parameter according to a bit or field that is in the control information and indicates the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

In a second application scenario, the UE determines, according to the control information, a second parameter for enhanced transmission of the control information, and then determines, according to the second parameter for enhanced transmission of the control information, the first parameter to which the second parameter is mapped.

For example, the UE determines, according to the second parameter for enhanced transmission of the control information and a one-to-one mapping relationship between the first parameter and the second parameter, the first parameter to which the second parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information.

Specifically, when performing detection on control information, the UE first determines a second parameter, and performs detection on repeatedly transmitted control information according to the determined second parameter. If the detection fails, the UE redetermines a second parameter, and performs detection on the repeatedly transmitted control information according to the redetermined second parameter, until the control information is detected successfully. When the control information is detected successfully, the UE may determine, according to the one-to-one mapping relationship between the first parameter and the second parameter, the first parameter corresponding to the second parameter used when the control information is detected successfully.

It should be noted that, for a specific implementation manner of the one-to-one mapping relationship between the first parameter and the second parameter, reference may be made to the one-to-one mapping relationship between the first parameter and the second parameter in the embodiment shown in FIG. 1, which is not further described herein.

It should be noted that, for the second application scenario, when the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information, the first parameter to which the second parameter is mapped is determined according to the second parameter used in at least one subframe in multiple subframes in enhanced transmission of the control information. The at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

In this embodiment, control information in enhanced transmission is received; and a first parameter is determined according to the control information, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH. It should be noted that, between a base station and UE, a $k^{th}$ subframe after a last subframe in enhanced transmission of control information may be preset as a start subframe in enhanced transmission of a PDSCH, a $j^{th}$ subframe after the last subframe in enhanced transmission of the control information may be preset as a start subframe in enhanced transmission of a PUSCH, and a start subframe in enhanced transmission of the control information is preset, where the subframes may also be radio frames. The UE can determine a quantity of repetitions of enhanced transmission of the control information according to one or more of the preset start subframe, the preset radio frame, and the first parameter. Therefore, the UE can accurately determine the last subframe and/or radio frame occupied by the control information, and further, can accurately determine a start time for receiving the repeatedly transmitted PDSCH or a start time for repeatedly transmitting the PUSCH, thereby ensuring performance of the PDSCH or PUSCH, where the start time includes the start subframe and/or the start radio frame.

In the embodiment of the present disclosure, the receiving the repeatedly transmitted PDSCH may also be receiving the PDSCH, namely, receiving the PDSCH transmitted in one subframe. The repeatedly transmitting the PUSCH may also be transmitting the PUSCH.

On a basis of the foregoing embodiment, after step 202, the method may further include:

determining, according to the first parameter, an index of a start subframe of information carried in a physical shared channel in enhanced transmission, and starting from the subframe indicated by the index of the start subframe, performing enhanced transmission of the information carried in the physical shared channel; or determining, according to the first parameter, an index of a radio frame in which a start subframe of information carried in a physical shared channel in enhanced transmission is located, and starting from the radio frame indicated by the index of the radio frame in which the start subframe is located, performing enhanced transmission of the information carried in the physical shared channel; or determining, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, performing enhanced transmission of the information carried in the physical shared channel.

The physical shared channel includes the physical downlink shared channel (PDSCH) or the physical uplink shared channel (PUSCH). The performing enhanced transmission of the information carried in the physical shared channel may be receiving the repeatedly transmitted PDSCH, or receiving the information carried in the repeatedly transmitted PDSCH, or repeatedly transmitting the PUSCH, or repeatedly transmitting the information carried in the PUSCH.

It should be noted that, between the base station and the UE, the $k^{th}$ subframe after the last subframe occupied by the control information is preset as a start subframe for receiving a repeatedly transmitted downlink data channel, that is, the UE may determine, according to the last subframe occupied by the control information, the start subframe for receiving the repeatedly transmitted PDSCH, where k is a fixed constant; or between the base station and the UE, the $j^{th}$ subframe after the last subframe occupied by the control information is preset as a start subframe for repeatedly transmitting an uplink data channel, that is, the UE may determine, according to the last subframe occupied by the control information, the start subframe for repeatedly transmitting the PUSCH, where j is a fixed constant.

In this embodiment, the start time for receiving the repeatedly transmitted PDSCH or the start time for repeatedly transmitting the PUSCH may be accurately determined, so that the repeatedly transmitted PDSCH can be received accurately or that the PUSCH can be repeatedly transmitted accurately. Therefore, transmission performance of the PDSCH or the PUSCH is improved, and utilization of system resources is also improved.

Figure 3:
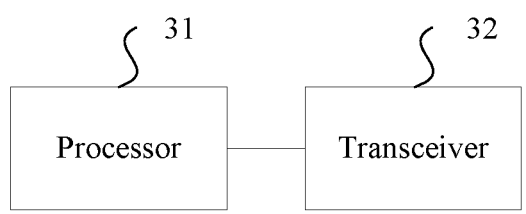
FIG. 3 is a schematic structural diagram of a base station according to an embodiment of the present disclosure.

FIG. 3 is a schematic structural diagram of a base station according to an embodiment of the present disclosure. As shown in FIG. 3, the base station includes a processor 31 and a transceiver 32, where the processor 31 is configured to determine a first parameter, where the first parameter includes at least one of a quantity of repetitions of enhanced transmission of control information, a repetition level of enhanced transmission of control information, a quantity of subframes occupied in enhanced transmission of control information, an index of a last subframe in enhanced transmission of control information, an index of a radio frame in which a last subframe in enhanced transmission of control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of control information and a start subframe in enhanced transmission of a PDSCH, a subframe offset between a start subframe in enhanced transmission of control information and a start subframe in enhanced transmission of a PUSCH, a radio frame offset between a start radio frame in enhanced transmission of control information and a start radio frame in enhanced transmission of a PDSCH, or a radio frame offset between a start radio frame in enhanced transmission of control information and a start radio frame in enhanced transmission of a PUSCH; and the transceiver 32 is configured to perform enhanced transmission of the control information according to the first parameter.

In the embodiment of the present disclosure, a first parameter for enhanced transmission of control information is determined, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH; and enhanced transmission of the control information is performed according to the first parameter. It should be noted that, between a base station and UE, a $k^{th}$ subframe after a last subframe in enhanced transmission of control information may be preset as a start subframe in enhanced transmission of a PDSCH, a $j^{th}$ subframe after the last subframe in enhanced transmission of the control information may be preset as a start subframe in enhanced transmission of a PUSCH, and a start subframe in enhanced transmission of the control information is preset, where the subframes may also be radio frames. The UE can determine a quantity of repetitions of enhanced transmission of the control information according to one or more of the preset start subframe, the preset radio frame, and the first parameter. Therefore, the UE can accurately determine the last subframe and/or radio frame occupied by the control information, and further, can accurately determine a start time for receiving the repeatedly transmitted PDSCH or a start time for repeatedly transmitting the PUSCH, thereby ensuring performance of the PDSCH or PUSCH, where the start time includes the start subframe and/or the start radio frame.

On a basis of the foregoing embodiment, the control information includes information indicating the first parameter.

Specifically, that the control information includes information indicating the first parameter includes at least the following two implementation manners, specifically including:

a first implementation manner: a bit or field that is in the control information and indicates first information indicates the first parameter, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or a second implementation manner: the control information includes a bit or field indicating the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

In the embodiment of the present disclosure, a first parameter for enhanced transmission of control information is determined, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH; and enhanced transmission of the control information is performed according to the first parameter. Therefore, the user equipment can accurately determine the last subframe and/or radio frame occupied by the control information, and further, can accurately determine the start subframe for receiving the repeatedly transmitted PDSCH or the start subframe for repeatedly transmitting the PUSCH, and utilization of system resources is also improved.

On a basis of the foregoing embodiment, a specific implementation manner of the processor 31 may specifically include:

the processor 31 is specifically configured to determine, according to the first parameter, a second parameter to which the first parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information; and the transceiver 32 is specifically configured to perform enhanced transmission of the control information according to the first parameter and/or the second parameter.

Optionally, the transceiver 32 is specifically configured to determine, according to the first parameter and a one-to-one mapping relationship between the first parameter and the second parameter, the second parameter to which the first parameter is mapped.

On a basis of the foregoing embodiment, the transceiver 32 is specifically configured to perform enhanced transmission of the control information by using the second parameter in at least one subframe in multiple subframes in enhanced transmission of the control information, where the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information.

Further, on a basis of the foregoing embodiment, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

On a basis of the foregoing embodiment, the processor 31 is further configured to determine, according to the first parameter, an index of a start subframe of information carried in a physical shared channel in enhanced transmission, and starting from the subframe indicated by the index of the start subframe, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a radio frame in which a start subframe of information carried in a physical shared channel in enhanced transmission is located, and starting from the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH); or the processor is further configured to determine, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH).

An implementation principle and a technical effect of the embodiment shown in FIG. 3 are similar to the implementation principle and the technical effect of the embodiment shown in FIG. 1, and are not further described herein.

Figure 4:
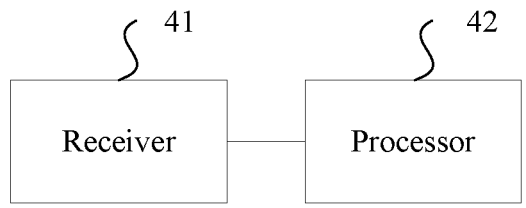
FIG. 4 is a schematic structural diagram of user equipment according to an embodiment of the present disclosure.

FIG. 4 is a schematic structural diagram of user equipment according to an embodiment of the present disclosure. As shown in FIG. 4, the user equipment includes a receiver 41 and a processor 42, where the receiver 41 is configured to receive control information in enhanced transmission; and the processor 42 is configured to determine a first parameter according to the control information, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH is located, an index of a radio frame in which a start subframe in enhanced transmission of a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH.

In this embodiment, control information in enhanced transmission is received; and a first parameter is determined according to the control information, where the first parameter includes at least one of a quantity of repetitions of enhanced transmission of the control information, a repetition level of enhanced transmission of the control information, a quantity of subframes occupied in enhanced transmission of the control information, an index of a last subframe in enhanced transmission of the control information, an index of a radio frame in which a last subframe in enhanced transmission of the control information is located, an index of a start subframe in enhanced transmission of a physical downlink shared channel (PDSCH) or a physical uplink shared channel (PUSCH), an index of a radio frame in which a start subframe in enhanced transmission of a PDSCH or a PUSCH is located, a subframe offset between a start subframe in enhanced transmission of the control information and a start subframe in enhanced transmission of a PDSCH, a subframe offset between a start subframe in enhanced transmission of the control information and a start subframe in enhanced transmission of a PUSCH, a radio frame offset between a start radio frame in enhanced transmission of the control information and a start radio frame in enhanced transmission of a PDSCH, or a radio frame offset between a start radio frame in enhanced transmission of the control information and a start radio frame in enhanced transmission of a PUSCH. It should be noted that, between a base station and UE, a $k^{th}$ subframe after a last subframe in enhanced transmission of control information may be preset as a start subframe in enhanced transmission of a PDSCH, a $j^{th}$ subframe after the last subframe in enhanced transmission of the control information may be preset as a start subframe in enhanced transmission of a PUSCH, and a start subframe in enhanced transmission of the control information is preset, where the subframes may also be radio frames. The UE can determine a quantity of repetitions of enhanced transmission of the control information according to one or more of the preset start subframe, the preset radio frame, and the first parameter. Therefore, the UE can accurately determine the last subframe and/or radio frame occupied by the control information, and further, can accurately determine a start time for receiving the repeatedly transmitted PDSCH or a start time for repeatedly transmitting the PUSCH, thereby ensuring performance of the PDSCH or PUSCH, where the start time includes the start subframe and/or the start radio frame.

On a basis of the foregoing embodiment, the processor 42 is specifically configured to determine the first parameter according to information that is included in the control information and indicates the first parameter.

For example, the processor 42 is specifically configured to determine the first parameter according to a bit or field that is in the control information and indicates first information, where the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the processor 42 is specifically configured to determine the first parameter according to a bit or field that is in the control information and indicates the first parameter, where the control information does not include a bit or field indicating first information, and the first information includes at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

In another implementation manner, on a basis of the foregoing embodiment, the processor 42 is specifically configured to determine, according to the control information, a second parameter for enhanced transmission of the control information, and determine, according to the second parameter for enhanced transmission of the control information, the first parameter to which the second parameter is mapped, where the second parameter includes at least one of a time resource used in enhanced transmission of the control information, a frequency resource used in enhanced transmission of the control information, a resource element RE used in enhanced transmission of the control information, an aggregation level of a control channel used in enhanced transmission of the control information, a pattern used in enhanced transmission of the control information, a search space corresponding to an aggregation level of a control channel used in enhanced transmission of the control information, an index of a control channel candidate used in enhanced transmission of the control information, an index of a first control channel element used in enhanced transmission of the control information, a control channel element set used in enhanced transmission of the control information, a format used in enhanced transmission of the control information, a load size used in enhanced transmission of the control information, a scrambling sequence used in enhanced transmission of the control information, or a radio network temporary identifier used in enhanced transmission of the control information.

For example, the processor 42 is specifically configured to determine, according to the second parameter for enhanced transmission of the control information and a one-to-one mapping relationship between the first parameter and the second parameter, the first parameter to which the second parameter is mapped.

The processor 42 is specifically configured to determine, according to the second parameter used in at least one subframe in multiple subframes in enhanced transmission of the control information, the first parameter to which the second parameter is mapped, where the second parameter is at least one of the frequency resource used in enhanced transmission of the control information, the resource element RE used in enhanced transmission of the control information, the aggregation level of the control channel used in enhanced transmission of the control information, the search space corresponding to the aggregation level of the control channel used in enhanced transmission of the control information, the index of the control channel candidate used in enhanced transmission of the control information, the index of the first control channel element used in enhanced transmission of the control information, or the control channel element set used in enhanced transmission of the control information.

Further, on a basis of the foregoing embodiment, the at least one subframe in the multiple subframes in enhanced transmission of the control information includes the start subframe in enhanced transmission of the control information, or the last subframe in enhanced transmission of the control information, or a $p^{th}$ subframe in the multiple subframes in enhanced transmission of the control information, or q subframes specified in advance in the multiple subframes in enhanced transmission of the control information, or all subframes for indicating enhanced transmission of the control information, where p and q are positive integers.

Optionally, on a basis of the foregoing embodiment, the processor 42 is further configured to determine, according to the first parameter, an index of a start subframe of information carried in a physical shared channel in enhanced transmission, and starting from the subframe indicated by the index of the start subframe, perform enhanced transmission of the information carried in the physical shared channel, where the physical shared channel includes the physical downlink shared channel (PDSCH) or the physical uplink shared channel (PUSCH); or the processor 42 is further configured to determine, according to the first parameter, an index of a radio frame in which a start subframe of information carried in a physical shared channel in enhanced transmission is located, and starting from the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH); or the processor 42 is further configured to determine, according to the first parameter, an index of a start subframe of information carried in a physical shared channel in enhanced transmission and an index of a radio frame in which the start subframe is located, and starting from the subframe indicated by the index of the start subframe and the radio frame indicated by the index of the radio frame in which the start subframe is located, perform enhanced transmission of the information carried in the physical shared channel, where the physical shared channel includes the physical downlink shared channel (PDSCH) or the physical uplink shared channel (PUSCH).

An implementation principle and a technical effect of the embodiment shown in FIG. 4 are similar to the implementation principle and the technical effect of the embodiment shown in FIG. 2, and are not further described herein.

An embodiment of the present disclosure provides a communications system, including the foregoing base station shown in FIG. 3 and the foregoing user equipment shown in FIG. 4.

An implementation principle and a technical effect of the communications system provided by the embodiment of the present disclosure are similar to the implementation principles and the technical effects of the embodiments shown in FIG. 1 and FIG. 2, and are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for enhanced transmission of control information, wherein the method comprises:
    determining a first parameter, wherein the first parameter comprises a repetition level of enhanced transmission of control information;
    determining, according to the first parameter and a one-to-one mapping relationship between the first parameter and a second parameter, the second parameter to which the first parameter is mapped, wherein the second parameter comprises a search space corresponding to an aggregation level of a control channel used in the enhanced transmission of the control information and a time resource used in the enhanced transmission of the control information;
    determining, according to the first parameter, an index of a radio frame in which a start subframe of information carried in a physical shared channel in enhanced transmission is located;
    performing the enhanced transmission of the control information according to the first parameter and the second parameter; and
    starting from the radio frame indicated by the index of the radio frame in which the start subframe is located, performing enhanced transmission of the information carried in the physical shared channel, wherein the physical shared channel comprises a physical downlink shared channel (PDSCH) or a physical uplink shared channel (PUSCH).

2. The method according to claim 1, wherein the control information comprises information indicating the first parameter.

3. The method according to claim 2, wherein a bit or field that is in the control information and indicates first information indicates the first parameter, wherein the first information comprises at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the control information comprises a bit or field indicating the first parameter, wherein the control information does not comprise a bit or field indicating first information, and the first information comprises at least one of hybrid automatic repeat request (HARQ) process number information, resource allocation information, modulation and coding scheme (MCS) information, transmit power control (TPC) information, redundancy version (RV) indicator information, uplink index (UL) information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

4. The method according to claim 1, further comprising:
    determining, according to the first parameter, an index of a second start subframe of information carried in a second physical shared channel in enhanced transmission, and starting from the second start subframe indicated by the index of the second start subframe, performing enhanced transmission of the information carried in the second physical shared channel, wherein the second physical shared channel comprises a physical downlink shared channel (PDSCH) or a physical uplink shared channel (PUSCH); or
    determining, according to the first parameter, an index of a third start subframe of information carried in a third physical shared channel in enhanced transmission and an index of a second radio frame in which the third start subframe is located, and starting from the third start subframe indicated by the index of the third start subframe and the second radio frame indicated by the index of the second radio frame in which the third start subframe is located, performing enhanced transmission of the information carried in the third physical shared channel, wherein the third physical shared channel comprises a physical downlink shared channel (PDSCH) or a physical uplink shared channel (PUSCH).

5. An apparatus, comprising:
    a processor, configured to;
    determine a first parameter, wherein the first parameter comprises a repetition level of enhanced transmission of control information,
    determine, according to the first parameter and a predefined one-to-one mapping relationship between the first parameter and a second parameter, the second parameter to which the first parameter is mapped, wherein the second parameter comprises a search space corresponding to an aggregation level of a control channel used in the enhanced transmission of the control information and a time resource used in the enhanced transmission of the control information,
    determine, according to the first parameter, an index of a radio frame in which a start subframe of information carried in a physical shared channel in enhanced transmission is located; and
    a transceiver, configured to
    perform the enhanced transmission of the control information according to the first parameter and the second parameter, and starting from the radio frame indicated by the index of the radio frame in which the start subframe is located, perform enhanced transmission of the information carried in the physical shared channel, wherein the physical shared channel comprises a physical downlink shared channel (PDSCH) or a physical uplink shared channel (PUSCH).

6. The apparatus according to claim 5, wherein the control information comprises information indicating the first parameter.

7. The apparatus according to claim 6, wherein a bit or field that is in the control information and indicates first information indicates the first parameter, wherein the first information comprises at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the control information comprises a bit or field indicating the first parameter, wherein the control information does not comprise a bit or field indicating first information, and the first information comprises at least one of hybrid automatic repeat request (HARQ) process number information, resource allocation information, modulation and coding scheme (MCS) information, transmit power control (TPC) information, redundancy version (RV) indicator information, uplink index (UL) information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

8. The apparatus according to claim 5, wherein the transceiver is further configured to perform the enhanced transmission of the control information by using the second parameter in at least one subframe in multiple subframes in the enhanced transmission of the control information, wherein the second parameter is at least one of a frequency resource used in enhanced transmission of the control information, a resource element (RE) used in enhanced transmission of the control information, an aggregation level of the control channel used in enhanced transmission of the control information, the search space corresponding to the aggregation level of the control channel used in enhanced transmission of the control information, an index of a control channel candidate used in enhanced transmission of the control information, an index of a first control channel element used in enhanced transmission of the control information, or a control channel element set used in enhanced transmission of the control information.

9. The apparatus according to claim 5, wherein:
the processor is further configured to determine, according to the first parameter, an index of a second start subframe of information carried in a second physical shared channel in enhanced transmission, and starting from the second start subframe indicated by the index of the second start subframe, perform enhanced transmission of the information carried in the second physical shared channel, wherein the second physical shared channel comprises a physical downlink shared channel (PDSCH) or a physical uplink shared channel (PUSCH); or the processor is further configured to determine, according to the first parameter, an index of a third start subframe of information carried in a third physical shared channel in enhanced transmission and an index of a second radio frame in which the third start subframe is located, and starting from the third start subframe indicated by the index of the third start subframe and the second radio frame indicated by the index of the second radio frame in which the third start subframe is located, perform enhanced transmission of the information carried in the third physical shared channel, wherein the third physical shared channel comprises a physical downlink shared channel (PDSCH) or a physical uplink shared channel (PUSCH).

10. An apparatus, comprising:
a receiver, configured to receive control information in enhanced transmission; and
a processor, configured to
determine, according to the control information, a second parameter used in the enhanced transmission of the control information, and determine, according to the second parameter used in the enhanced transmission of the control information and a one-to-one mapping relationship between a first parameter and the second parameter, the first parameter to which the second parameter is mapped, wherein the second parameter comprises a search space corresponding to an aggregation level of a control channel used in the enhanced transmission of the control information and a time resource used in the enhanced transmission of the control information, and the first parameter comprises a repetition level of the enhanced transmission of the control information,
determine, according to the first parameter, an index of a radio frame in which a start subframe of information carried in a physical shared channel in enhanced transmission is located,
wherein the control information was sent to the receiver according to the first parameter and the second parameter, and
the information carried in the physical shared channel was sent to the receiver starting from the radio frame indicated by the index of the radio frame in which the start subframe is located, wherein the physical shared channel comprises a physical downlink shared channel (PDSCH) or a physical uplink shared channel (PUSCH).

11. The apparatus according to claim 10, wherein the processor is further configured to determine the first parameter according to information that is comprised in the control information and indicates the first parameter.

12. The apparatus according to claim 11, wherein the processor is further configured to determine the first parameter according to a bit or field that is in the control information and indicates first information, wherein the first information comprises at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or the processor is further configured to determine the first parameter according to a bit or field that is in the control information and indicates the first parameter, wherein the control information does not comprise a bit or field indicating first information, and the first information comprises at least one of hybrid automatic repeat request (HARQ) process number information, resource allocation information, modulation and coding scheme (MCS) information, transmit power control (TPC) information, redundancy version (RV) indicator information, uplink index (UL) information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

13. The apparatus according to claim 10, wherein the processor is further configured to determine, according to the second parameter used in at least one subframe in multiple subframes in the enhanced transmission of the control information, the first parameter to which the second parameter is mapped, wherein the second parameter is at least one of a frequency resource used in enhanced transmission of the control information, a resource element (RE) used in enhanced transmission of the control information, an aggregation level of the control channel used in enhanced transmission of the control information, the search space corresponding to the aggregation level of the control channel used in enhanced transmission of the control information, an index of a control channel candidate used in enhanced transmission of the control information, an index of a first control channel element used in enhanced transmission of the control information, or a control channel element set used in enhanced transmission of the control information.

14. The apparatus according to claim 10, wherein the processor is further configured to determine, according to the first parameter, an index of a second start subframe of information carried in a second physical shared channel in enhanced transmission, and starting from the second start subframe indicated by the index of the second start subframe, perform enhanced transmission of the information carried in the second physical shared channel, wherein the second physical shared channel comprises a physical downlink shared channel (PDSCH) or a physical uplink shared channel (PUSCH); or the processor is further configured to determine, according to the first parameter, an index of a third start subframe of information carried in a third physical shared channel in enhanced transmission and an index of a second radio frame in which the third start subframe is located, and starting from the third start subframe indicated by the index of the third start subframe and the second radio frame indicated by the index of the second radio frame in which the third start subframe is located, perform enhanced transmission of the information carried in the third physical shared channel, wherein the third physical shared channel comprises a physical downlink shared channel (PDSCH) or a physical uplink shared channel (PUSCH).

15. A method, comprising:

receiving control information in enhanced transmission;

determining, according to the control information, a second parameter used in the enhanced transmission of the control information, and determining, according to the second parameter used in the enhanced transmission of the control information and a predefined one-to-one mapping relationship between a first parameter and the second parameter, the first parameter to which the second parameter is mapped, wherein the second parameter comprises a search space corresponding to an aggregation level of a control channel used in the enhanced transmission of the control information and a time resource used in the enhanced transmission of the control information, the first parameter comprises a repetition level of the enhanced transmission of the control information;

determining, according to the first parameter, an index of a radio frame in which a start subframe of information carried in a physical shared channel in enhanced transmission is located, the physical shared channel comprising a physical downlink shared channel (PDSCH) or a physical uplink shared channel (PUSCH), wherein the control information received in enhanced transmission having been sent according to the first parameter and the second parameter; and receiving the information carried in the physical shared channel starting from the radio frame indicated by the index of the radio frame in which the start subframe is located.

16. The method according to claim 15, further comprising determining the first parameter according to information that is comprised in the control information and indicates the first parameter.

17. The method according to claim 16, further comprising:

determining the first parameter according to a bit or field that is in the control information and indicates first information, wherein the first information comprises at least one of hybrid automatic repeat request (HARQ) process number information, resource allocation information, modulation and coding scheme (MCS) information, transmit power control (TPC) information, redundancy version (RV) indicator information, uplink index (UL) index information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information; or determining the first parameter according to a bit or field that is in the control information and indicates the first parameter, wherein the control information does not comprise a bit or field indicating first information, and the first information comprises at least one of hybrid automatic repeat request (HARQ) process number information, resource allocation information, modulation and coding scheme (MCS) information, transmit power control (TPC) information, redundancy version (RV) indicator information, uplink index (UL) information, downlink assignment index (DAI) information, resource allocation type information, channel state information request information, sounding reference signal request information, frequency hopping flag information, localized/distributed virtual resource block allocation flag information, precoding matrix indicator information, downlink power offset information, or carrier indicator information.

18. The method according to claim 15, further comprising determining, according to the second parameter used in at least one subframe in multiple subframes in the enhanced transmission of the control information, the first parameter to which the second parameter is mapped, wherein the second parameter is at least one of a frequency resource used in enhanced transmission of the control information, a resource element (RE) used in enhanced transmission of the control information, an aggregation level of the control channel used in enhanced transmission of the control information, the search space corresponding to the aggregation level of the control channel used in enhanced transmission of the control information, an index of a control channel candidate used in enhanced transmission of the control information, an index of a first control channel element used in enhanced transmission of the control information, or a control channel element set used in enhanced transmission of the control information.

19. The method according to claim 15, further comprising:

determining, according to the first parameter, an index of a second start subframe of information carried in a second physical shared channel in enhanced transmission, and starting from the second start subframe indicated by the index of the second start subframe, performing enhanced transmission of the information carried in the second physical shared channel, wherein the second physical shared channel comprises a physical downlink shared channel (PDSCH) or a physical uplink shared channel (PUSCH); or determining, according to the first parameter, an index of a third start subframe of information carried in a third physical shared channel in enhanced transmission and an index of a second radio frame in which the third start subframe is located, and starting from the third start subframe indicated by the index of the third start subframe and the second radio frame indicated by the index of the second radio frame in which the third start subframe is located, performing enhanced transmission of the information carried in the third physical shared channel, wherein the third physical shared channel comprises a physical downlink shared channel (PDSCH) or a physical uplink shared channel (PUSCH).

* * * * *